May 7, 1935. A. PATE 2,000,145
SELF WINDING SPRING MOTOR
Filed Oct. 20, 1931 5 Sheets-Sheet 1
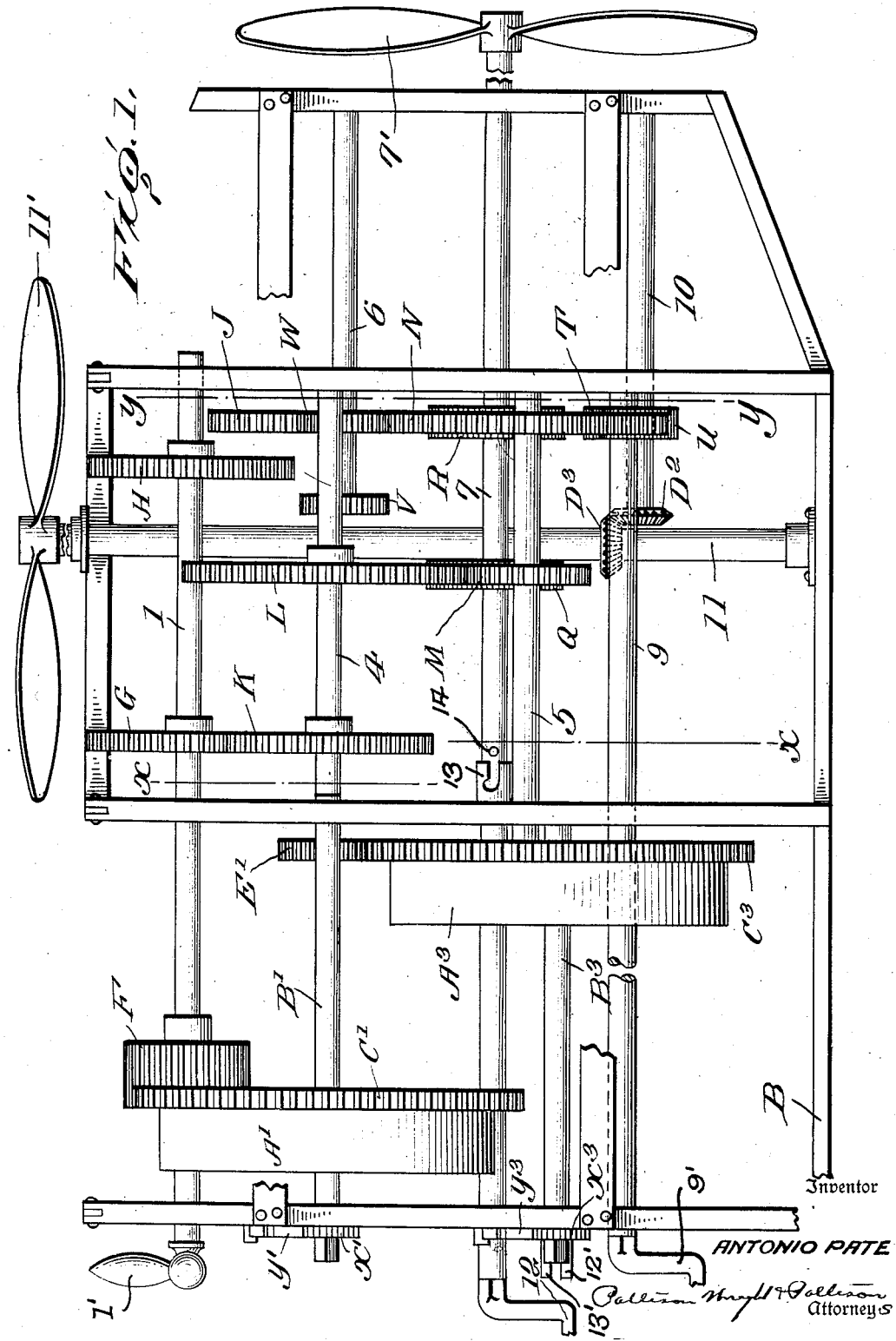
Inventor
ANTONIO PATE
Attorneys May 7, 1935.  A. PATE  2,000,145
SELF WINDING SPRING MOTOR
Filed Oct. 20, 1931   5 Sheets-Sheet 2
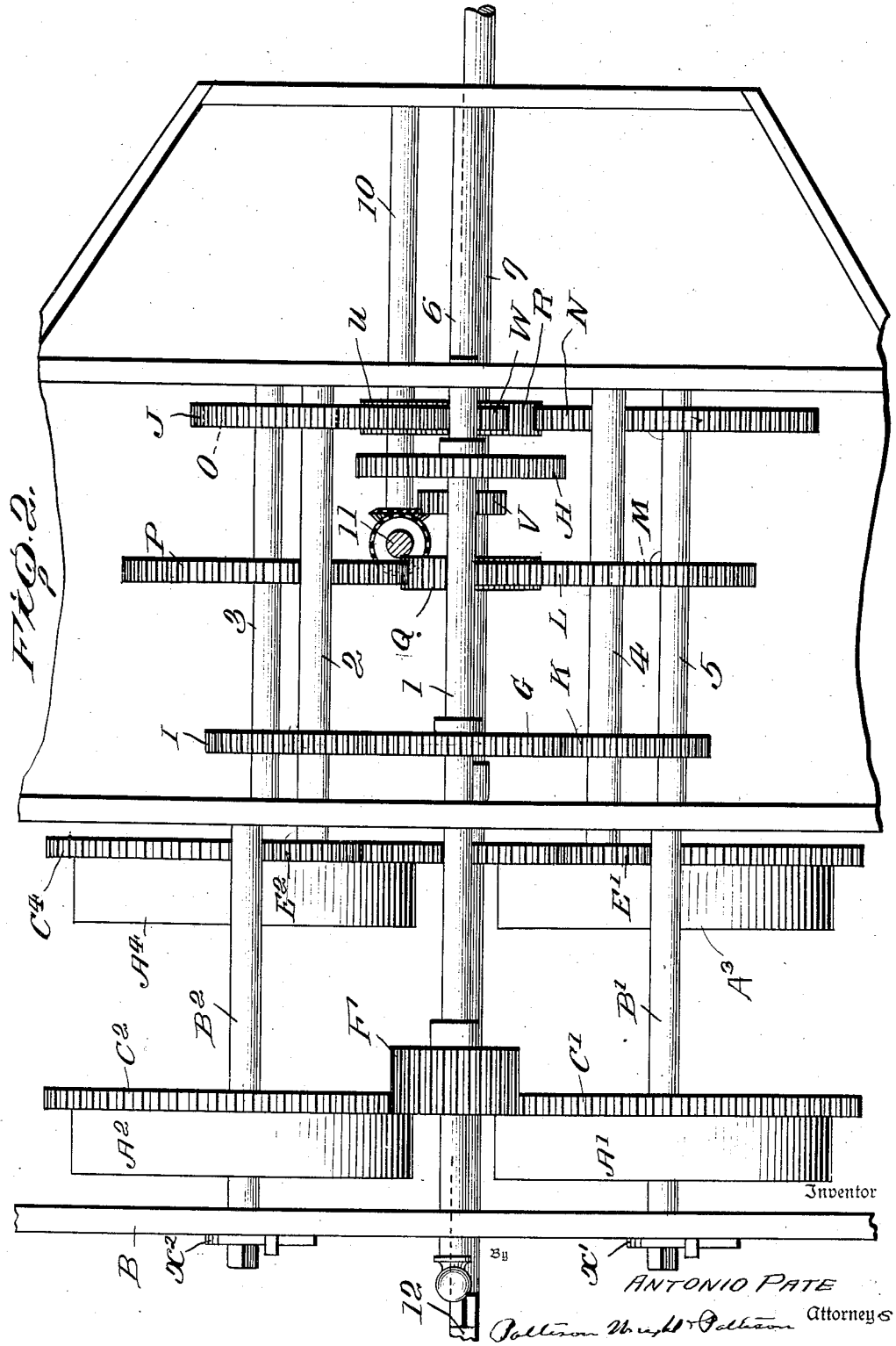
Inventor
ANTONIO PATE
Attorneys May 7, 1935. A. PATE 2,000,145
SELF WINDING SPRING MOTOR
Filed Oct. 20, 1931 5 Sheets-Sheet 3
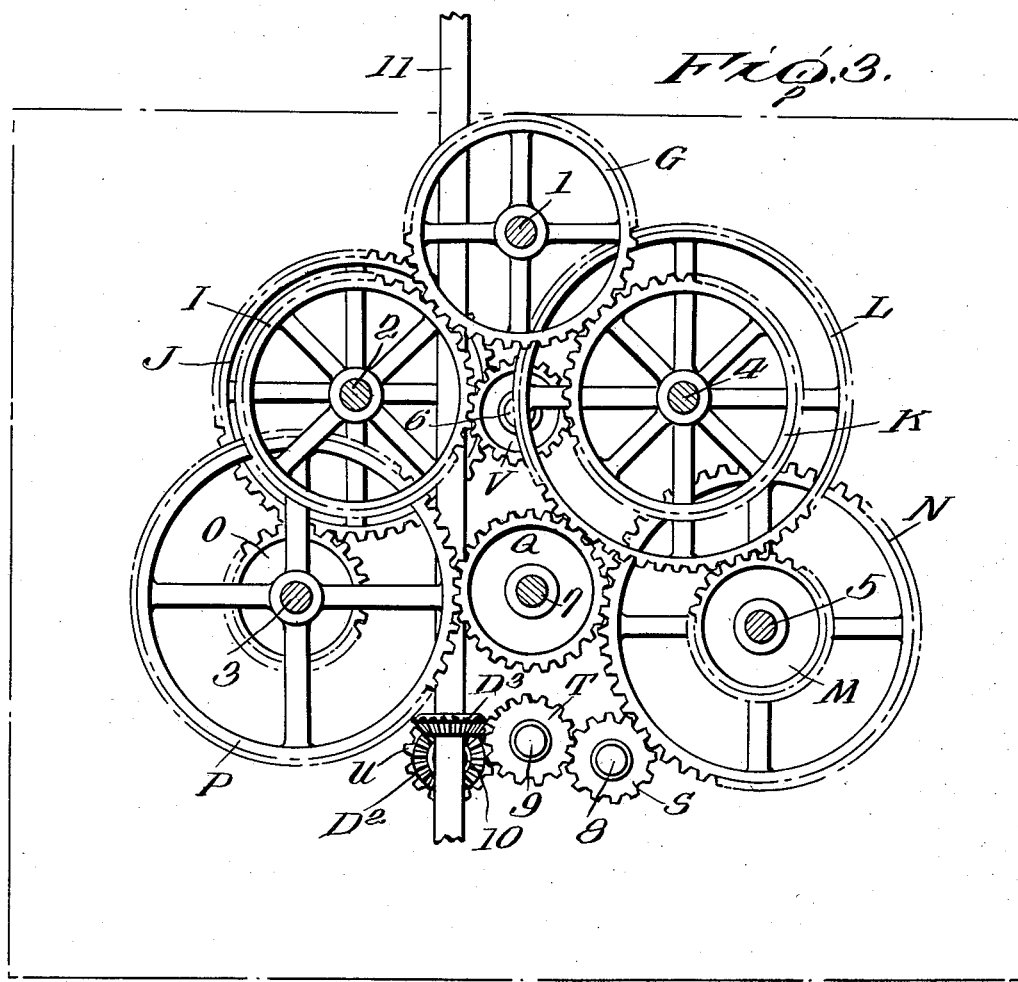
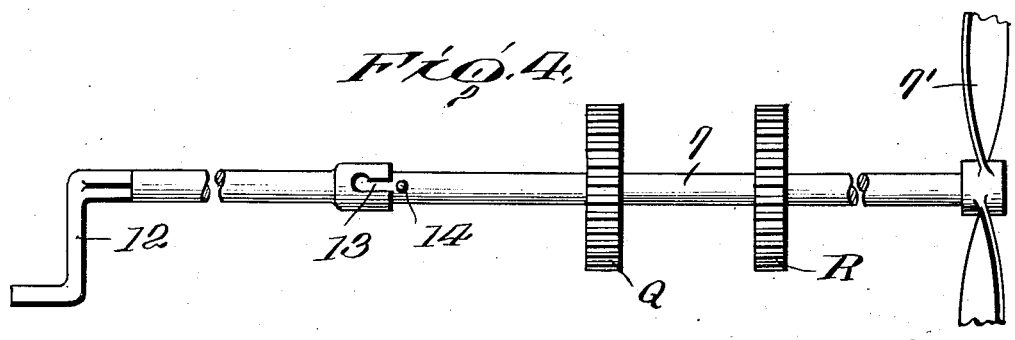
Inventor
ANTONIO PATE May 7, 1935.   A. PATE   2,000,145
SELF WINDING SPRING MOTOR
Filed Oct. 20, 1931   5 Sheets-Sheet 4

Inventor
ANTONIO PATE
By
Pattison Wright & Pattison
Attorneys

May 7, 1935. A. PATE 2,000,145
SELF WINDING SPRING MOTOR
Filed Oct. 20, 1931  5 Sheets-Sheet 5
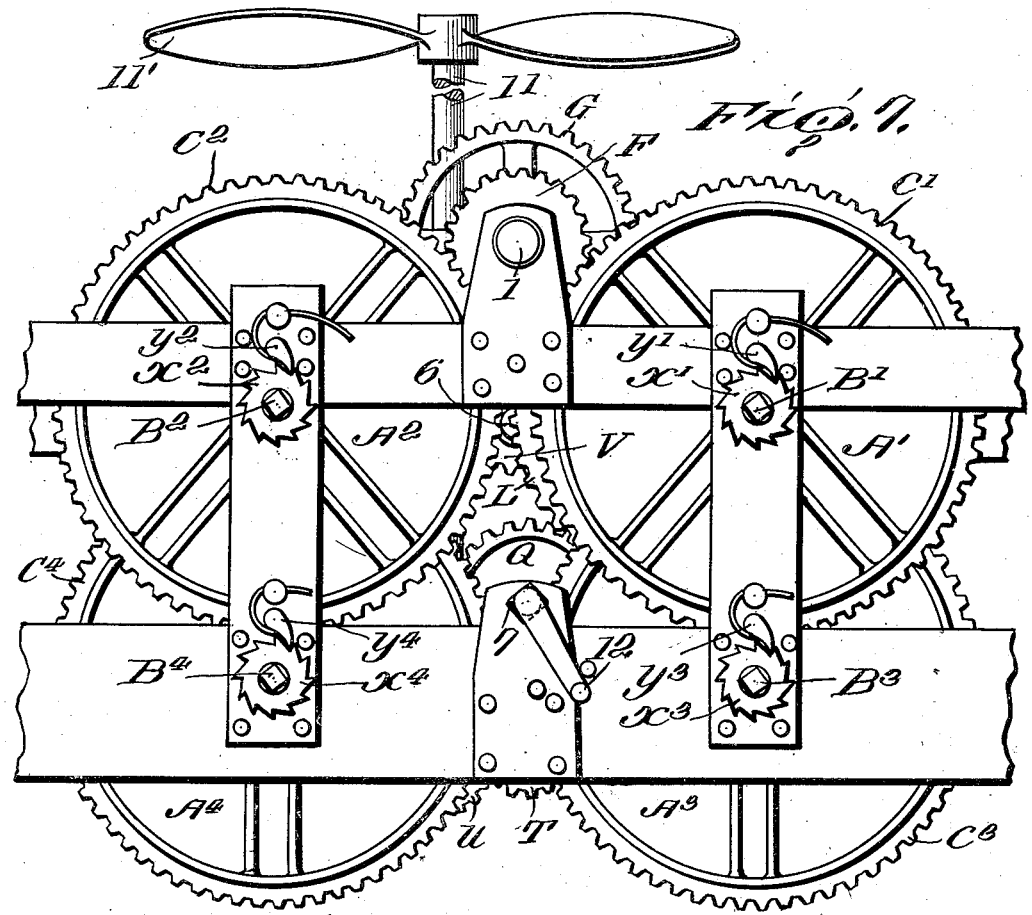
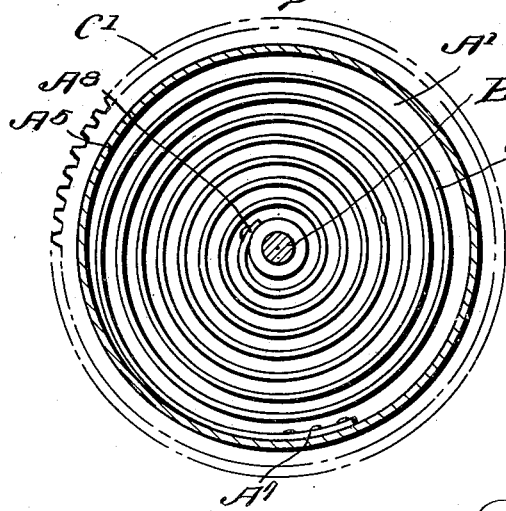
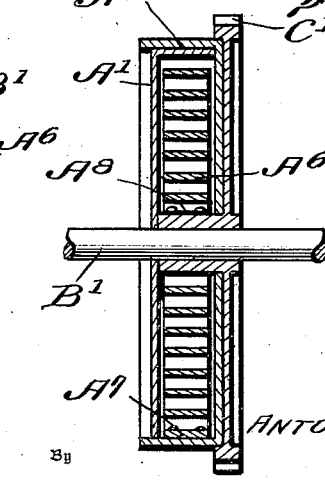
Inventor
ANTONIO PATE Patented May 7, 1935

2,000,145

UNITED STATES PATENT OFFICE 2,000,145

SELF WINDING SPRING MOTOR

Antonio Pate, North Providence, R. I.

Application October 20, 1931, Serial No. 569,988

6 Claims. (Cl. 185—40)

This invention relates to certain new and useful improvements in self winding spring motors for driving automobiles, ships, aeroplanes and machines of all kinds, the object being to provide a spring motor with two sets of driving units either or both of which can be used to drive the propeller shaft, means being provided for allowing one set of units to be rewound while the other set of units is in operation.

Another object of my invention is to provide a motor which is exceedingly cheap and simple in construction, the same being composed of parts so mounted in respect to each other that a positive drive connection is obtained from the energy of the springs to drive either a vertically or horizontally disposed propeller shaft.

Another and further object of the invention is to provide a spring motor with a horizontally disposed propeller shaft driven by the energy of springs, means being provided for stopping the rotation of said shaft at the will of the operator and means being provided for throwing in the power from the energy of the springs to drive the vertically disposed propeller shaft carrying the horizontally disposed propeller whereby a gyroscope type of airplane can be driven by the spring motor constructed according to my invention.

Other and further objects and advantages of the invention will be hereinafter set forth and the novel features thereof defined by the appended claims.

In the drawings,

Figure 1 is a side elevation of a spring motor constructed in accordance with my invention;

Fig. 2 is a top plan view of the motor;

Fig. 3 is a section taken on line X—X of Figure 1;

Fig. 4 is a detailed elevation of the horizontally disposed propeller shaft and the means for controlling the same;

Fig. 7 is an end elevation;

Fig. 8 is a detailed section through one of the gears and housing showing the coil spring;

Fig. 9 is a section taken at right angles to that of Figure 8.

Figure 5:
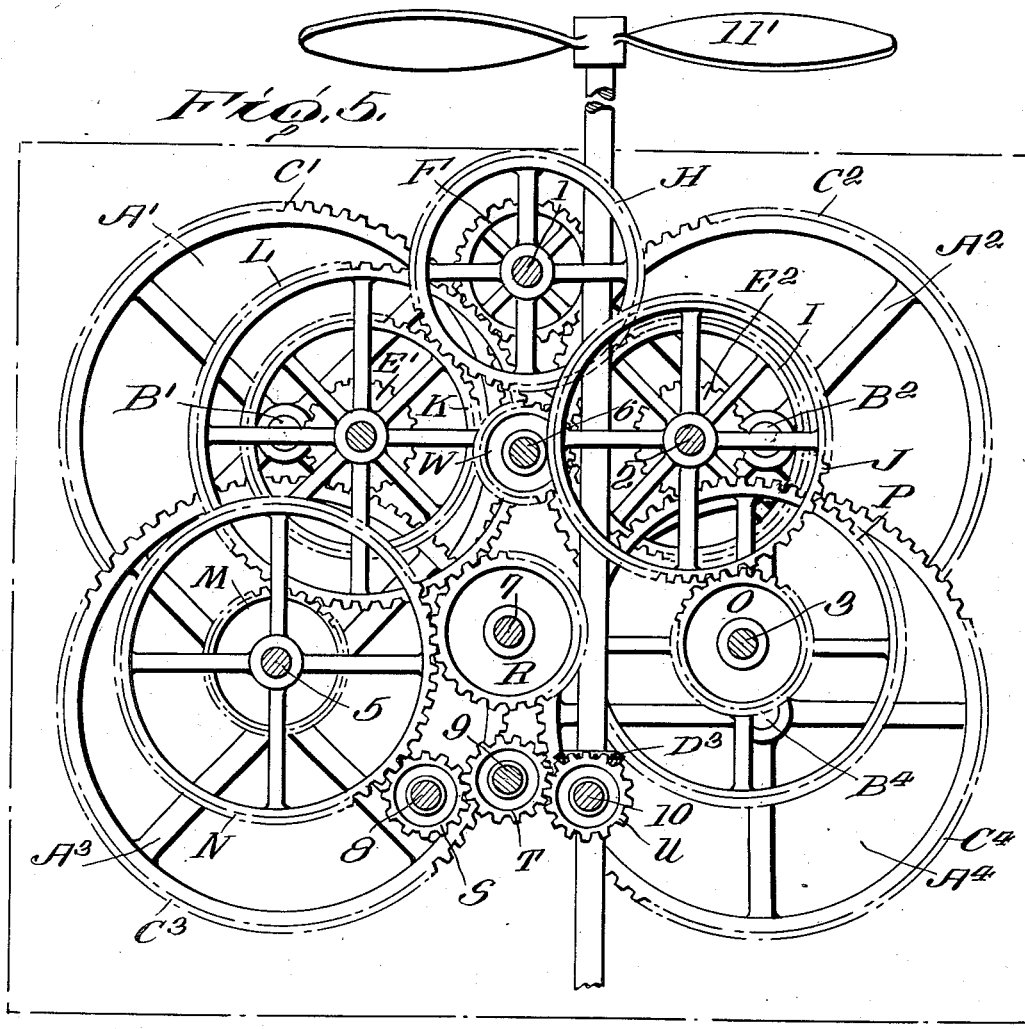
Fig. 5 is a section taken on the line Y—Y of Figure 1.
Figure 6:
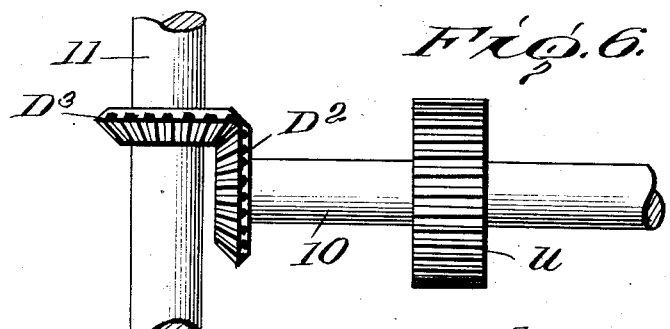
Fig. 6 is a detailed view showing the driving connection with the vertically disposed propeller shaft.

In the embodiment of my invention as herein shown I have illustrated a spring motor especially adapted for use for driving the vertical and horizontal propellers of an airplane, but it is of course understood that the same can be used for driving a motor vehicle or any other vehicle desired.

In the drawings B indicates a frame in which are mounted shafts B', B², B³ and B⁴ carrying gears C', C², C³ and C⁴ which are provided with housings enclosing coil springs A', A², A³ and A⁴ from the energy of which the propeller shafts are adapted to be driven. Arranged within the frame B are a series of shafts 1, 2, 3, 4, 5, 6, 7, 8, 9, 10 and 11, the shaft 7 being the horizontally disposed propeller shaft carrying the propeller 7', and the shaft 11 being a vertically disposed propeller shaft carrying the propeller 11'. The shaft 1 at its outer end is provided with a knob or handle 1' whereby the same can be moved back and forth.

The shaft 1 is provided with a gear F which meshes with the gears C', C² and as the gears C', C² are revolved by the energy of the springs the shaft 1 will be rotated through the medium of the gear F. The shaft 1 is also provided with gears G and H as clearly shown. Fixed on the shaft 2 are gears I, J and E². Fixed on the shaft 3 are gears P and O and shaft 4 has three gears K, L and E'. The shaft 5 is provided with two gears M and N. The energy stored up in the springs A', A² through the medium of the gears C', C² and the gear F causes the shaft 1 to revolve and as the shaft 1 carries the gear G which meshes with the gear I carried by the shaft 2 and gear K, shaft 4, both shafts 2 and 4 are driven by coils A' and A².

This puts in motion shafts 1, 2 and 4 and gear J on shaft 2 meshes with gear O shaft 3 which also puts in motion gear P. Gear L on shaft 4 meshes with gear M carried by shaft 5 and gear N is now put in motion. The shaft 7 has two gears Q and R attached thereto and the gear N on shaft 5 meshes with gear R on shaft 7 and gear P on shaft 3 meshes with gear Q on shaft 7 so as to set in motion the propeller shaft. Gear N also meshes with gear S, shaft 8. The shaft 10 has a gear U and a pinion gear D² for operating the vertically disposed propeller shaft and the shift rod or shaft 9 carries a gear T meshing with the gear U. When the rod is pushed in this position so as to bring these gears into mesh the vertically disposed propeller shaft 11 will be driven in order to lift the airplane.

The shafts B', B², B³ and B⁴ are provided with squared head ends adapted to receive the crank for winding the springs for operating the motor and these shafts carry ratchet wheels X', X², X³ and X⁴ which are engaged by the pawls Y', Y², Y³ and Y⁴ as clearly shown in Figure 7. The propeller shaft 7 carries a pin 14 which is adapted to receive the slot 13 of a head of a crank 12 which is slidably mounted within the frame so that when it is desired to start the motor by drawing outwardly on the crank to bring it out beyond the pins 12' and 13' and to disengage the pin 14 from the head of the same the propeller shaft will be free to be driven through the medium of the gears and by this construction the motor can be started and stopped by moving the crank inwardly and outwardly. When the crank 12 is moved inwardly to engage shaft 7, the crank passes between the pins 12' and 13' and the crank held against rotation and the motor stopped.

When the power has been partially exhausted the operator pulls outwardly on shaft 1 until the gear G is disengaged from the gears I and K and which simultaneously moves gear H into mesh with gear V on shaft 6 and which causes the two power springs $A^3$ and $A^4$ to still furnish power to the propeller shaft while the coils A' and $A^2$ are being rewound.

Assuming that the coil springs have been wound up manually and that the crank 12 is drawn outwardly the power from the coils A', $A^2$, and $A^3$ and $A^4$ through the medium of the gears C', $C^2$, $C^3$, and $C^4$ drive the respective shafts through the medium of the various gears so as to drive the propeller shaft 7. By shifting the shaft 9 the power is converted to the vertical propeller shaft 11 so as to drive the vertical propeller shaft with its propeller, it of course being understood that as the shaft 9 is slidably mounted it is connected and disconnected with the vertical propeller shaft and is controlled by the operator. By having the gear F on shaft 1 of sufficient width the shaft can be moved backwards and forwards without disconnecting the gear F from the gears C' and $C^2$.

In the operation of the spring motor when applied to an airplane as herein shown, the operator first draws out the crank 12 to release the propeller shaft and the energy of the springs drives the propeller shaft through the medium of the various gears. After part of the energy which has been stored up in the springs, is utilized the shaft 1 is shifted so that gear G is released from gears I and K and gear H carried by shaft 1 is brought into mesh with gear V carried by shaft 6 so that this shaft 6 is driven from gear $C^4$ by means of the pinion $E^2$ on shaft 2, gear J and pinion W mounted thereon, while the shaft 6 is also driven by the gear $C^2$ by pinion $E^1$ shaft 4 gear L and pinion W so that the power springs $A^3$ and $A^4$ are still furnishing power while the power springs A' and $A^2$ are being rewound by hand.

It will be readily seen that there are two trains of gearing for driving the horizontal propeller shaft. One train of gearing comprises a shaft 4 having the gear E' meshing with the gear $C^3$ of the spring drum $A^3$. This shaft 4 carries a gear K meshing with the gear G carried by the shaft 1. This shaft 1 is driven through the elongated gear F meshing with gears C' and $C^2$ of the spring drums A' and $A^2$. The shaft 4 carries a gear L meshing with a small gear M mounted on the shaft 5. The shaft 5 is provided with a large gear N meshing with a pinion R on the propeller shaft 7. The other train of gearing comprises a shaft 2 having the gearing I meshing with the gear G carried by the shaft 1 and whereby the train of gearing is driven from the spring drums A' and $A^2$. The shaft 2 has a gear $E^2$ which meshes with the gear $C^4$ of the spring drum $A^4$. The shaft 2 also has mounted thereon a gear J which meshes with the pinion O mounted on shaft 3 and said shaft carrying the gear P which meshes with the gear 2 carried by the propeller shaft 7 and whereby the same can be driven through the second train of gearing.

From the foregoing description it will be seen that when the gear G is out of mesh with the gears I and K, the propeller shaft is being driven through the two trains of gearing from the spring drums A' and $A^2$, and the spring drums $A^3$ and $A^4$. When the shaft 1 is moved to engage the gear G with gears I and K, the gear H is moved out of engagement with the gear V and the same through the last two trains of gearing is being driven by the spring drums $A^3$ and $A^4$ for operating the propeller shaft. At the same time the shaft 1 is reversed and through the elongated gear F the spring drums $A^1$ and $A^2$ are being rewound. By the above described operation it will be seen that all four spring drums may be utilized to simultaneously drive the propellers or two may be used while the other two are being rewound.

What I claim is:

1. In a spring motor, a power shaft, a spring driving unit, trains of gearing for driving the power shaft, a second spring driving unit meshing with the train of gearing for furnishing additional power to the shaft, and a reverse gearing for rewinding the second spring driving unit by the first spring driving unit.

2. In a spring motor, a power shaft, a spring driven unit, a train of gearing connecting the unit and power shaft, a second spring driving unit having a gear meshing with the train of gearing and slidable gears for meshing with the different gears of the train whereby both spring driven units may drive the power shaft or the first unit rewind the second unit.

3. In a spring motor, a power shaft, a spring driving unit composed of two spring driven gears, a separate train of gearing connecting each gear to the power shaft, a second spring driven unit composed of two spring driven gears, a gear meshing with the two last mentioned gears and driving a shaft having gears adapted to mesh with one or both of the trains of gearing whereby both units may drive the power shaft or the first unit rewind the second unit.

4. In a spring motor, a power shaft, a spring driving unit, composed of two spring driven gears, a separate train of gearing connecting each gear to the power shaft, a second spring driven unit composed of two spring driven gears, an elongated gear meshing with the two last mentioned gears and slidably mounted and carrying gears adapted to mesh with one or both of the trains of gearing, whereby both units may drive the power shaft or the first unit will rewind the second unit.

5. In a spring motor a power shaft, a spring driving unit composed of two spring driven gears, a separate train of gearing connecting each gear to the power shaft, a second spring driven unit composed of two spring driven gears, an elongated gear meshing with the two last mentioned gears and slidably mounted, a shaft carried by the elongated gear, a gear carried by said shaft and meshing with a pinion in one of the train of gearing, and a gear carried by the shaft meshing with a gear of each train of gearing whereby both units may drive the power shaft or the first unit rewind the second unit.

6. In a spring motor, a power shaft, a spring driving unit composed of two spring driven gears, a separate train of gearing connecting each gear to the power shaft, a second spring driven unit composed of two spring driven gears, an elongated gear meshing with both of the last two mentioned gears and slidably mounted, a shaft carried by the elongated gear, a gear carried by said shaft and meshing with a pinion in one of the train of gearing, means for moving said shaft for disengaging said gear from the pinion of the train of gearing, and a gear carried by the shaft adapted to mesh with a gear of each train of gearing when the other gear carried by the shaft is disengaged from the pinion on the one train of gearing whereby both units may drive the power shaft or the first unit rewind the second unit.

ANTONIO PATE.